(12) United States Patent
Carrozza et al.

(10) Patent No.: US 6,434,361 B1
(45) Date of Patent: Aug. 13, 2002

(54) SYNCHRONIZATION BURST PROCESSOR FOR A PROCESSING SATELLITE

(75) Inventors: Dominic P. Carrozza, Redondo Beach; Vincent C. Moretti, Torrance; David A. Wright, Solana Beach; Gregory S. Caso, Hermosa Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/408,261

(22) Filed: Sep. 29, 1999

(51) Int. Cl.$^7$ ............................................. H04B 7/185
(52) U.S. Cl. ..................... 455/13.2; 455/12.1; 455/427; 455/430; 370/347; 370/324; 370/350; 375/343; 375/150; 375/354
(58) Field of Search ............................ 455/12.1, 13.2, 455/427, 428, 430; 370/315, 316, 321, 345, 505, 347, 324, 350; 375/343, 367, 149, 150, 152, 142, 354

(56) References Cited

U.S. PATENT DOCUMENTS

| 3,593,138 A | * | 7/1971 | Dunn et al. | .................... 342/88 |
| 4,346,470 A | * | 8/1982 | Alvarez et al. | ............. 370/324 |
| 6,072,786 A | * | 6/2000 | Wang et al. | ................. 370/316 |

* cited by examiner

Primary Examiner—Doris H. To
Assistant Examiner—Edan Orgad
(74) Attorney, Agent, or Firm—Harness, Dickey & Pierce, P.L.C.

(57) ABSTRACT

A synchronization burst processor (56) used in a processing satellite (12) in a satellite based communications system (10) is provided with a sync burst memory (72), a first double correlator (74), a second double correlator (76) and a modulus module (78). The sync burst memory (72) stores at least one sync burst (52) transmitted from a terrestrial terminal (14) to the processing satellite (12) where the sync burst (52) is formed from a quadrature pair sample set {p, q}. The first double correlator (74) performs an early correlation and a late correlation of the p samples relative to a sync burst slot (50) to generate an early correlation Pe and a late correlation Pl. The second double correlator (76) performs an early correlation and a late correlation of the q samples relative to the sync burst slot (50) to generate an early correlation Qe and a late correlation Ql. The modulus module (78) determines an early modulus Re and a late modulus Rl from the early correlations Pe and Qe and from the late correlations Pl and Ql. The early modulus Re and the late modulus Rl are used to determine if the sync burst (52) is present in the sync burst slot (50) and if the sync burst (52) is early or late relative to the sync burst slot (50).

20 Claims, 6 Drawing Sheets

SYNCHRONIZATION BURST PROCESSOR FOR A PROCESSING SATELLITE

BACKGROUND OF THE INVENTION

1. Field of the Invention

This invention relates generally to a communications system and, more particularly, to a synchronization burst processor for use in a processing satellite of a satellite based cellular communications system.

2. Discussion of the Related Art

In a satellite based cellular communications system, a central terrestrial control processor or a network control center (NCC) generally controls one or more processing satellites operating within the communications system. Each processing satellite within the communications system services multiple users located in multiple geographic areas, known as ground cells. The processing satellites receive and transmit data signals to and from the multiple users or terrestrial terminals positioned at different locations within the ground cells on a point-to-point manner, via uplinks and downlinks. In a processing satellite using time division multiple access (TDMA) on the uplink from the terrestrial terminal to the processing satellite, it is necessary to provide a means of measuring the time of arrival of transmissions from the various terrestrial terminals in a given uplink beam so that the timing of the user transmissions may be adjusted to maintain a requisite precision. This process may be resolved into two distinct phases. One directed to the initial entry and the other directed to the long term maintenance.

For the long term maintenance, user terminals are provided with periodic time frames or slots to send an explicit synchronization burst to maintain this timing. These sync bursts are short, binary phase shift key (BPSK) sequences, with a fixed structure and convey no information other than the fact that the burst is present and whether the burst is early or late relative to the slot, as observed by the processing satellite. The user terminal sends these sync bursts in either the active or the standby state. In the long term maintenance phase, it is also assumed that the user terminal knows the range of a processing satellite with sufficient accuracy that its sync bursts will arrive at the processing satellite within a timing error that is a small fraction of the signaling epoch, which in no case should exceed approximately one third of the symbol epoch. The means by which the processing satellite learns of the sync burst slot or the initial entry which is reserved for its use, as well as how the user terminal learns the range to the processing satellite are set forth in detail in U.S. Ser. No. 09/270,167, filed on Mar. 16, 1999, and entitled "Initial Entry Processor For A Processing Satellite" and, TRW Docket No. 22-0056, filed herewith, and entitled "Synchronization Scheme For A Processing Communication Satellite", which are each hereby incorporated by reference.

Each synchronization burst processor is generally required to serve the total bandwidth of a sub-band (typically 17 MHz), of which there are typically seven (7) sub-bands in each beam of the processing satellite coverage area. Transmission within each sub-band may be configured in one of three modes and the synchronization burst processor must be able to serve each such mode. These modes include type X where the sync burst processor handles one single high speed channel or user at a time with each user occupying a full bandwidth of the sub-band. Type Y where the sync burst processor handles typically five (5) medium size users or channels sharing the bandwidth by FDMA. Type Z where the synchronization burst processor concurrently receives signals from typically twenty five (25) low speed users or channels sharing the bandwidth again by FDMA.

Dedicated sync burst time slots within each frequency channel are provided in the uplink frequency and time plan of each sub-band for each beam of the processing satellite to accommodate sync bursts forwarded by user terminals. In time, these sync burst time slots are organized in sync burst blocks containing multiple time slots. Typically, there are twenty such slots in a block on one such channel per TDMA frame for mode z, 100 per frame per channel for mode Y, and 500 per frame for mode x. Each of these slots is sufficiently longer than the length N, of a sync burst (typically N=64 symbols) to avoid adverse interactions between consecutive sync bursts. A typical sync burst slot width is 72 symbols, thereby providing a guard band of 8 symbols. The product of the number of channels per sub-band and the number of slots per block is constant and is generally about 500 for the typical case. The duration of the sync burst block is also the same in each mode, which is about twenty-eight hundred and eighty microseconds (2880 $\mu$s) for a typical case with the sync burst interval being concurrent across all channels (within a sub-band).

The synchronization burst processor is required to examine the signal presence within each sync burst slot and reach one of three decisions. These decisions include a sync burst is present within an acceptable timing error and it is either (1) early or (2) late, or (3) no sync burst is present within acceptable timing limits. The synchronization burst processor must also function reliably without knowing the phase of the uplink signal. However, the synchronization burst processor may rely on the signal amplitude being well controlled as a result of uplink power control procedures. The synchronization burst processor may also rely upon the incoming frequency of both the signal carrier and of the symbol epoch clock being very close to its own timing.

What is needed then is a synchronization burst processor for a processing satellite in a satellite based cellular communications system that meets the above requirements. This will, in turn, provide a synchronization burst processor for operation in a processing satellite that: is capable of operating solely on odd sample data; provides dual correlators; is capable of operating in multiple operating modes with different channelizations; does not respond to noise when synch bursts are absent; does not respond to poorly aligned sync bursts; reduces processing load due to operating on one sample per symbol (odd samples); reduces processing load due to efficient dual correlators; reduces data transferred within the satellite because of highly efficient report structures; and provides reprogrammable or loadable preamble sequence templates. It is, therefore, an object of the present invention to provide such a synchronization burst processor for a processing satellite operating in a satellite based cellular communications system.

SUMMARY OF THE INVENTION

In accordance with the teachings of the present invention, a synchronization burst processor for use in a processing satellite in a satellite based communications system is provided. The synchronization burst processor operates in multiple operating modes to perform double correlations and determine a modulus of these double correlations to determine if sync bursts are present and whether the sync bursts are early or late relative to a sync burst slot.

In one preferred embodiment, a synchronization burst processor for use in a processing satellite in a satellite based communications system includes a sync burst memory, a first double correlator, a second double correlator, and a modulus module. The sync burst memory is operable to store at least one sync burst transmitted from a terrestrial terminal to the processing satellite with the sync burst being formed from a quadrature pair sample set {p, q}. The first double correlator performs an early correlation and a late correlation of the p samples relative to a sync burst slot to generate an early correlation Pe and a late correlation Pl. The second double correlator performs an early correlation and a late correlation of the q samples relative to the sync burst slot to generate an early correlation Qe and a late correlation Ql. The modulus module determines an early modulus Re and a late modulus Rl from the early correlations Pe and Qe and from the late correlations Pl and Ql such that the early modulus Re and late modulus Rl are used to determine if the sync burst is present in the sync burst slot and if the sync burst is early or late relative to the sync burst slot.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiments concerning a synchronization burst processor for a processing satellite used in a satellite based cellular communications system is merely exemplary in nature and is not intended to limit the invention or its application or uses.

Figure 1:
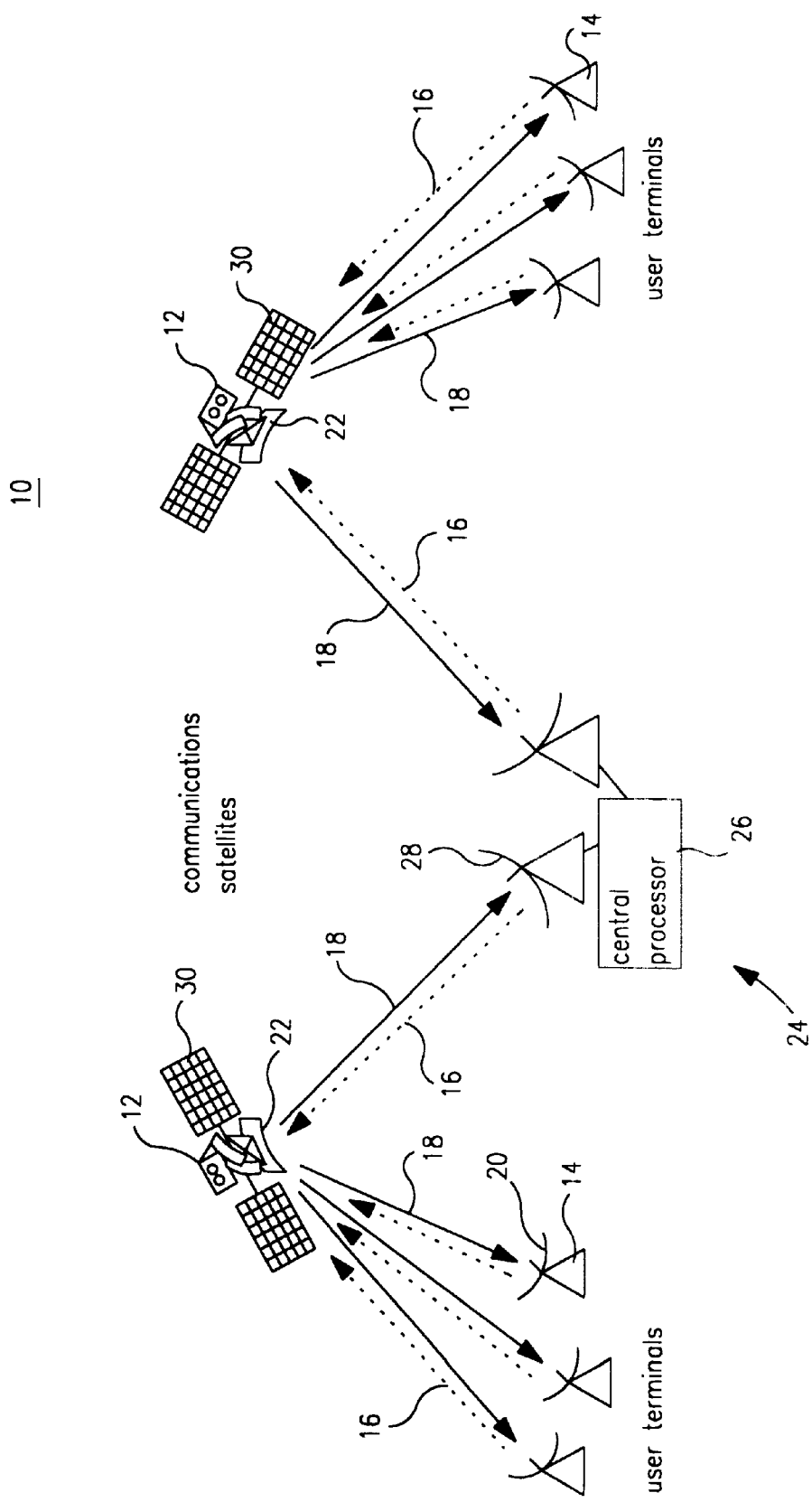
FIG. 1 is an overall satellite based cellular communications system block diagram.

Referring to FIG. 1, a satellite based cellular communications system 10 for supporting multiple users located in multiple geographic areas or ground cells is shown. The communications system 10 includes one or more processing satellites 12 operating generally in geosynchronous orbits. Each processing satellite 12 supports multiple terrestrial user terminals 14 positioned within various defined ground cells, further discussed herein. Each processing satellite 12 receives data signals from the user terminals 14 on the communications uplinks 16 and transmits data signals to the user terminals 14 on the communications downlinks 18. Each user terminal 14 transmits data signals on the communications uplinks 16, which may include multiple carrier channels and formats, and receives data signals on the communications downlinks 18, via an antenna 20. Each processing satellite 12 receives and transmits the data signals on the communications uplinks 16 and the communications downlinks 18, via a multibeam antenna 22 or any other appropriate antenna to service the required region.

The satellite based cellular communications system 10 also includes a network control center (NCC) 24 which includes a central control processor 26. The network control center 24 generally controls the overall operations of each processing satellite 12 utilizing communications uplinks 16 and communications downlinks 18, via an antenna 28. These overall operations include maintenance of the geosynchronous orbit, positioning of solar collectors 30, initializing satellite system parameters, user billing, as well as other operational controls which are all well known in the art. The central control processor 26 in the network operations center 24 is preferably a general purpose programmable computer of appropriate computational power.

Figure 2:
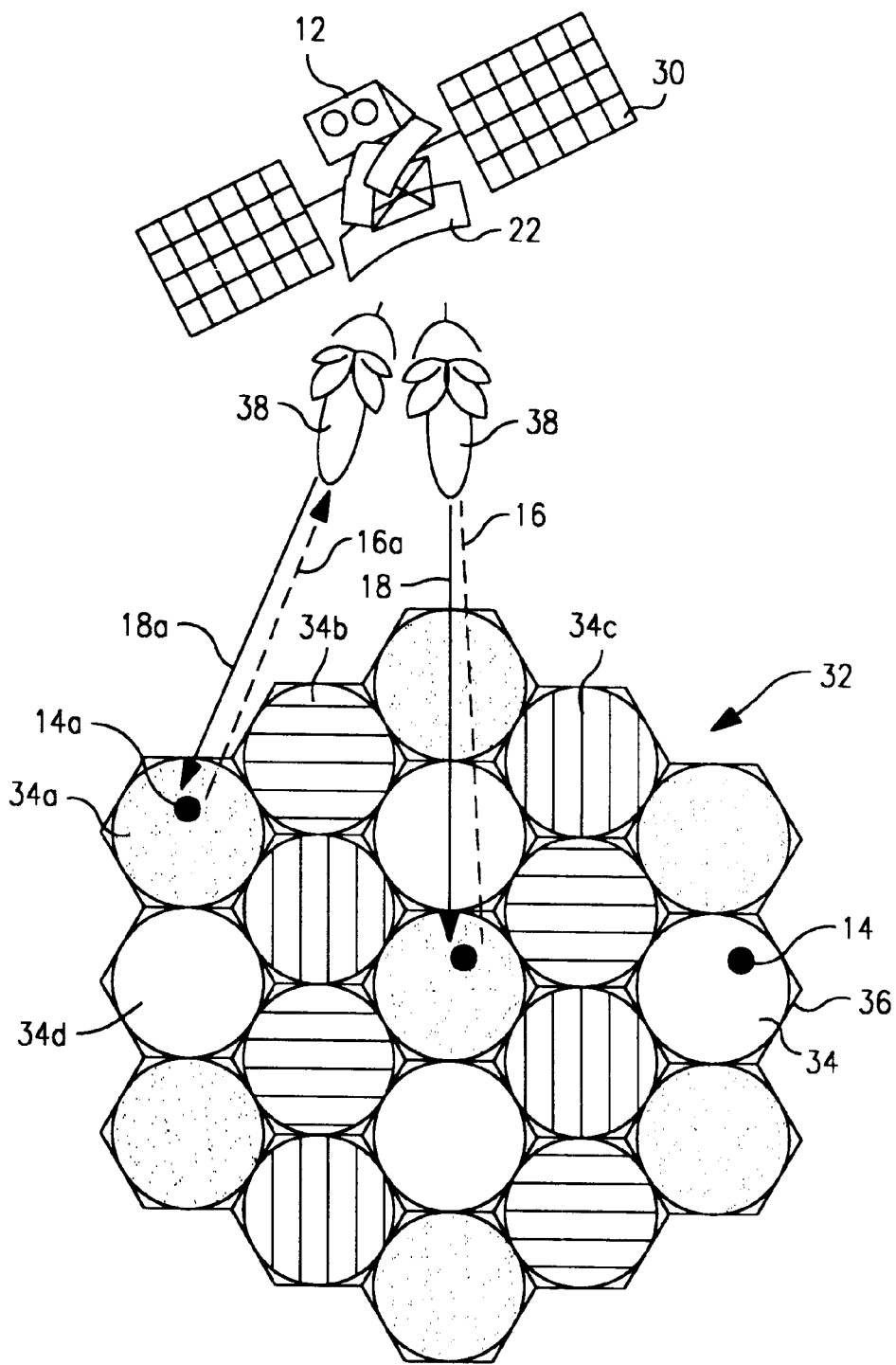
FIG. 2 is a detailed layout diagram of communications uplinks and downlinks between terrestrial user terminals located within multiple ground cells and a processing communications satellite.

Referring now to FIG. 2, a processing communications satellite 12 is shown illuminating a coverage region 32, via antenna 22. The processing satellite 12 services the coverage region 32 which includes multiple ground cells 34 represented by each hexagonal shaped region 36 that are the regions each individually illuminated by one antenna beam from the multibeam antenna 22 on the communications satellite 12. Each ground cell 34 typically measures approximately 300 to 400 miles in diameter and is generally measured as the shortest distance between two points where the antenna gain is minimally acceptable. For example, this may be a point at which the antenna gain drops off by 5 or 6 dB.

The coverage region 32 is shown utilizing what is known as a 4-to-1 reuse where the coverage region 32 is separated into one of four types of ground cells 34a–34d. Of course, any other type of reuse pattern may also be employed. Each of the ground cells 34 having the same shading operate within the same frequency band. Each frequency band, which is preferably about 125 MHz wide, is separated into preferably seven sub-bands (carrier frequency channels), each having a bandwidth of about 17.85 MHz. The sub-bands are available to users or terrestrial terminals 14 operating within the ground cells 34. For example, each of the ground cells 34a may be allocated a first 125 MHz frequency band that is divided into seven 17.8 MHz sub-bands where each sub-band may be divided into multiple channels of 1, 5 or 25 (X, Y, and Z). In this way, user terminal 14a within ground cell 34a may be allocated at least one of the channels within at least one of the sub-bands and at least one of the time slots allocated to that particular channel. Similarly, each of the ground cells 34b may be allocated a second 125 MHz frequency band, each of the ground cells 34c may be allocated a third 125 MHz frequency band and each of the ground cells 34d may be allocated a fourth 125 MHz frequency band. In other words, all of the ground cells identified as 34a will be operated within the same 125 MHz frequency band having the same channels available and so forth throughout each set of ground cells 34 within the coverage region 32.

User terminal 14a in ground cell 34a may be operating within one of the seven (7) sub-bands of the first 125 MHz frequency band and say, for example, channel one of a Y mode allocation. The communications uplink 16a originating from user terminal 14a is directed into a main beam 38 of the multibeam antenna 22 servicing ground cell 34a. User terminal 14a may also be bursting on and off within a particular time slot for carrier channel one within the sub-band. User terminal 14a may also use additional carrier channels within the sub-band and/or additional time slots depending on how much bandwidth the user terminal 14a requires to transmit all its data, via the communications uplink 16a.

Each of the communications downlinks 18 from the communications satellite 12 to the multiple user terminal 14 within each group of ground cells 34a–34d operate on a single carrier frequency or channel and is generally always on. In other words, all of the ground cells 34a operate on a first carrier frequency, all of the ground cells 34b operate on a second carrier frequency and so forth. The downlink 18 for each group of ground cells 34a–34d bears a single TDM channel because of the limited power constraints associated with operating the processing communications satellite 12.

Figure 3:
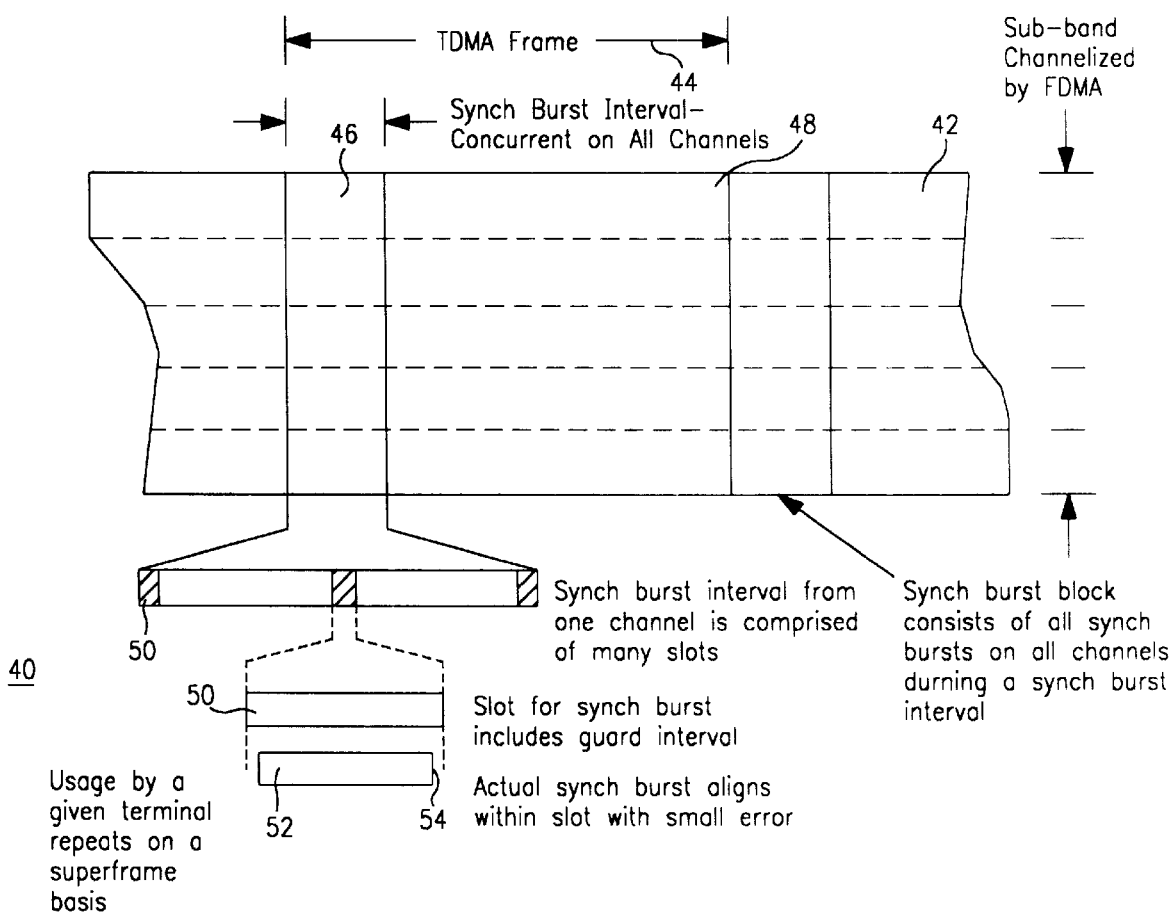
FIG. 3 is a detailed timing diagram illustrating a sync burst interval during mode Y operation.

Turning to FIG. 3, a sync burst organization 40 shown in frequency and time for a mode Y channelization is shown. In this regard, one of seven (7) 17.8 MHz sub-bands, divided into five separate channels, 42 is shown. Each sub-band is channelized by FDMA with each channel 42 further divided by TDMA frames 44. Each TDMA frame 44 consists of two parts which are a sync burst interval or block 46 and a traffic burst interval 48. The sync burst interval 46 is used for the synchronization timing while the traffic burst interval 48 contains the communications data. Each user terminal 14 is assigned at least one channel 42 in at least one TDMA frame 44 in that particular channel 42 containing its synch burst slot 50. Each of the sync bursts intervals 46 is also comprised of several slots, typically 100 slots 50 per sync burst interval 46 in each of the five channels 42. Each of the sync burst slots 50 is typically 72 symbols in length with each sync burst 52 consisting of typically 64 symbols in length to provide a guard time 54 of +/−4 for a total of 8 symbols to inhibit overlaps between slots 50. It should further be noted that there are two types of transmission originating from the various user terminals 14. These transmissions include active users which transmit, via the uplink 16, both sync bursts 52 and also traffic bursts within the traffic burst frames 48 and standby users which only transmit sync bursts 52.

Figure 4:
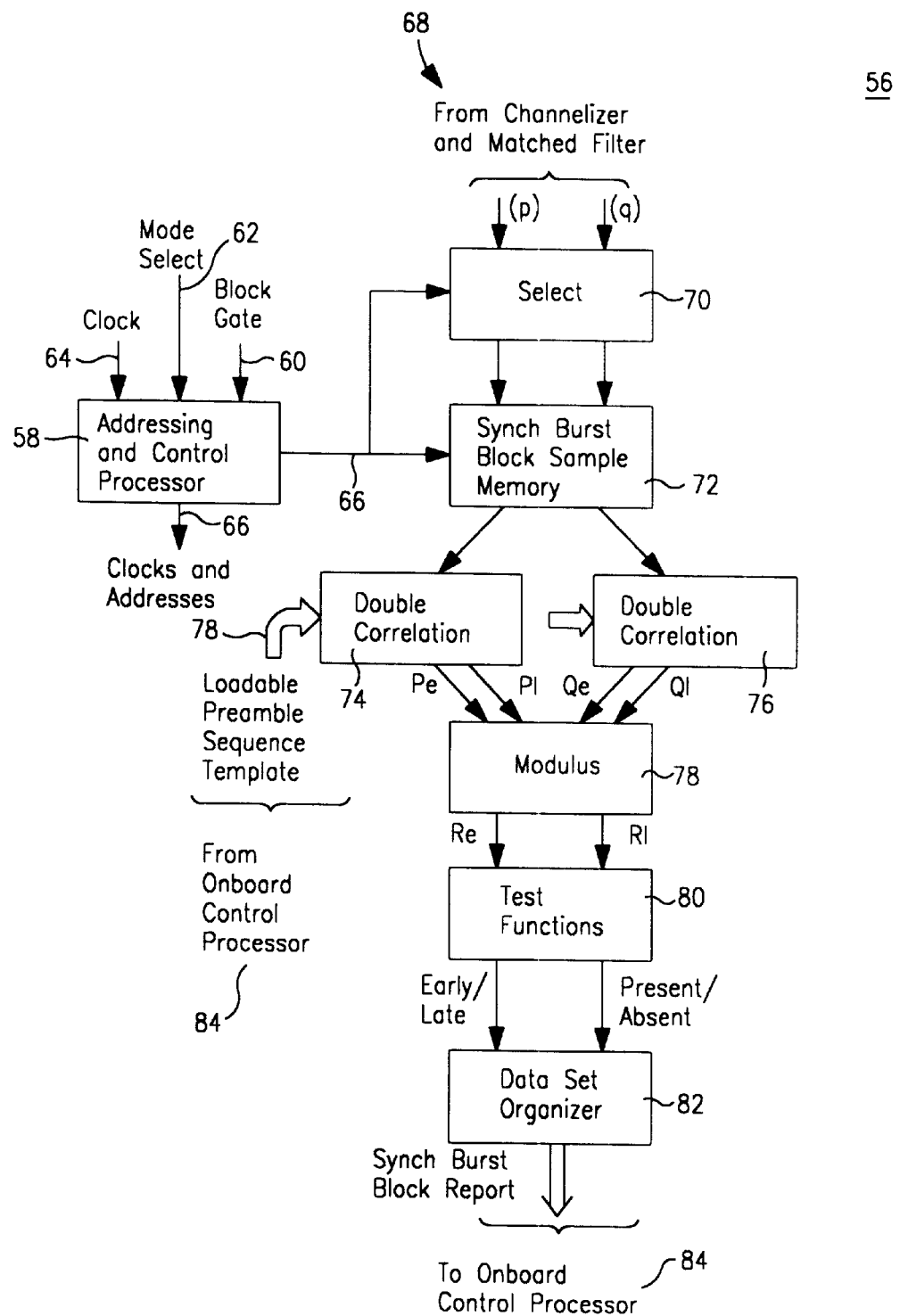
FIG. 4 is a detailed block diagram of a synchronization burst processor of the present invention used in the processing communications satellite.

Referring to FIG. 4, a synchronization burst processor (SBP) 56 according to the teachings of the present invention is shown. The synchronization burst processor 56 may be embodied as a buffer plus a microprocessor or as a buffer plus special purpose digital logic. The essential function of the synchronization burst processor 56 is to detect the presence of synchronization bursts 52 (when aligned within a small allowable timing uncertainty or sync burst slot 50) and to categorize the sync burst 52 as either early or late relative to the sync burst slot 50. The basic activity of the synchronization burst processor 56 consists of a brief real time interval during which the synchronization burst processor 56 acquires samples, followed by a processing interval during which the synchronization burst processor 56 assesses all of the sync burst slots 50 in the synchronization burst interval 46 and prepares a report. This later phase has the requirement that the processing for each sync burst block or interval 46 must be completed prior to the start of the next TDMA frame 44. Typical times are roughly about three milliseconds (3 ms) for the data capture and about ninety milliseconds (90 ms) for its processing.

While only one synchronization burst processor 56 is shown in FIG. 4, it should also be understood that multiple synchronization burst processors 56 are present within each processing satellite 12, with one being utilized for each of the seven (7) sub-bands within each ground cell 34. The synchronization burst processor 56 operates under the direction of an addressing and control module or processor 58. The addressing and control processor 58 receives a block or timing gate 60 from the processing satellites timing system which identifies when the sync burst block or interval 46 will occur. The addressing and control processor further receives a mode select input 62 which identifies which particular mode the synchronization burst processor 56 should be operated in (X, Y or Z), as well as a clock or timing signal input 54, all of which are provided, via the satellite's on-board processor.

The addressing and control processor 58 routes clock and address control for various memories, as well as an indication of when the sync burst interval 46 is going to occur (block gate 60), from multiple clock and address outputs 66 which are routed throughout the synchronization burst processor 56. In other words, the synchronization burst processor 56 accepts timing or block gates 60 from the satellite's uplink timing system to coordinate its activities and to limit its processing from a channelizer output during the sync burst interval 46. The synchronization burst processor 56 also receives the configuration control signals from the satellite's on board processor instructing it as to which of the modes it is to process, via the mode select input 62.

The synchronization burst processor 56 operates on digitized quadrature pair samples (p, q) from an upstream channelizer and matched filter 68 which are delivered to the synchronization burst processor 56 during a synchronization burst interval 46, shown in FIG. 3. In other words, the synchronization burst processor 56 interfaces with the channelizer and matched filter 68 to receive a sequence of complex sample pairs (p, q) during the sync burst block 46. These samples represent the complex (quadrature) values of the symbols transmitted in the sync bursts 52 (or of noise during the interval between sync bursts 52) on a two sample (odd and even) per symbol basis. Further details on the channelizer and matched filter is set forth in TRW Docket No. 22-0063, filed herewith, and entitled "Uplink Demodulator Scheme for a Processing Satellite", which is hereby incorporated by reference.

A select module 70 which is controlled by the addressing and control processor 58, via output 66, selects the complex quadrature pairs (p, q) of the symbols of the sync bursts 52 transmitted during the sync burst block 46 and inhibits the passing of any of the traffic bursts 48. It should be noted that the samples from each sync burst 52 in the X mode are time sequential, while in the Y and Z modes, the samples are interleaved as a result of the frequency multiplexing of the sub-bands in these modes. Thus, the total number of samples passed from the channelizer and matched filter 68 to the select module 70 is the number of sync bursts 52 per sync burst block or interval 46 times the number of symbols in a sync burst time slot 50 times 2 (two samples per symbol per arm) (500×72×2=72000 for the typical case) for each of the two quadrature arms (p,q).

These samples are categorized as "even" for those that correspond to the convergence of the matched filter "eye" diagram and "odd" for those that are a one-half symbol epoch removed therefrom (when the samples are taken precisely on time). Note that the presumed timing error of sync bursts 52 is small so that even and odd sets are always distinguishable apriori. The even samples are not relevant for timing purposes and only the odd quadrature pair samples (p, q) are needed by the synchronization burst processor 56. The select module 70 therefore immediately discards the even samples and forwards the odd samples or one sample per symbol for the quadrature arms p and q from the select module 70 to a sync burst block sample memory 72 which is a memory buffer. The sample memory 72 receives the odd samples from the quadrature pair sample set {p, q} that may be mixed in frequency and time and stores them in memory and demultiplexes them (if necessary) when removed from memory. In other words, for modes Y and Z, the channelizer samples are demultiplexed in the sync burst block sample memory 72 under the control of the address and control processor 56 according to the number of frequency multiplexed channels that are present.

In this regard, the demultiplexing process merely involves recovering the samples from the sample memory 72 using an address that increments by the number of frequency multiplexed channels in the sub-band (five or twenty five for modes Y and Z in the example structure) so that the samples from the given sync burst block 46 may be withdrawn from the sample memory 72 in the appropriate time sequence. For example, assuming 65 sample pairs or symbols per channel are used, if in X mode, 65 sample pairs are read into the sample memory 72 and read directly out of the memory 72. If in Y mode, 325 (65×5) sample pairs are read into the sample memory 72 such as by channel 0, 1, 2, 3, 4, 0, 1, 2, ..., and removed as five separate channel sets of 65 sample pairs. If in the Z mode, 1575 samples (65×25) are read in the sample memory 72 and read out as twenty-five sets of 65 sample pairs. Therefore, the sync burst block sample memory 72 demultiplexes the data sets per channel or separates the sample pairs per channel depending upon which mode of operation the synchronization burst processing 56 is operating in.

The real samples {p} from the sync burst block sample memory 72 are forwarded to a double correlator 74, while the imaginary samples {q} are forwarded to a double correlator 76. Each double correlator 74 and 76 essentially determines an early and late signal plus noise value from the sync burst samples. In other words, each double correlator 74 and 76 derotates the complex sample pairs brought in, in accordance with a loadable template sequence, so that, the correlation of the early or late sample set versus the template is formed. Each double correlator 74 and 76 further receives a loadable preamble sequence template 78 from the onboard control processor within the processing satellite 12. These loadable templates 78 are used as the basis for correlation where each beam has a separate pattern or a template it uses for a sync burst 52 which consists of a string of pluses and minuses used in the correlation process.

Each double correlator 74 and 76 withdraws N+1 (64+1) of the odd samples from the sample memory 72 per sync burst slot 50. When perfect uplink timing alignment exists, the first of the samples (at epoch N=0) occurs half a symbol epoch ahead of the eye diagram peak for the first symbol in the sync burst 52. Similarly, the last sample (at epoch n=N) would occur half a symbol behind the eye diagram peak for the last symbol in the sync burst 52 (see FIG. 5). To facilitate the further description of the sync burst processor 56, the following notation will be used to describe the sample set:

{po(n), qo(n)} where n=0 to N.

In this notation, p and q identify the processing arm to which the sample belongs, o denotes that odd samples are used, n indexes the order of the symbol epochs at which the sample was formed, and N is the number of symbols in the sync burst 52. This sample set permits the arriving sync burst 52 to be compared with its template under normal ½ symbol early and ½ symbol late hypotheses.

The additional samples in each sync burst slot 50 constitute the guard time 54 and are discarded in the sample memory 72. Thus, in the typical case, the synchronization burst processing 56 uses 65 samples from the sample memory 72 for each candidate sync burst 52 and discards seven.

The double correlator 74 operates on the real samples {p}, while the double correlator 76 operates on the imaginary samples {q}. The synchronization burst processor 56 correlates the odd N+1 sample set against the known pattern of the sync burst (sequence template 78). For each of the quadrature pair sample sets {p, q} from the sample memory 72, two correlations are performed in each double correlator 74 and 76 (early, late), one is normally a half epoch early and the other is normally a half epoch late. To simplify the handling of the data samples as they pass from the sample memory 72 to the double correlators 74 and 76, the sample set of N+1 is entered into both the early and late correlators in each double correlator 74 and 76. Note that one term in the template has value zero, so that only N samples contribute to each of the correlations. The outputs from the double correlator 74 and 76, are designated Pe, Qe, Pl, Ql, where Pe refers to the real early correlation, Pl refers to the real late correlation, Qe refers to the imaginary early correlation and Ql refers to the imaginary late correlation.

The processing steps to produce Pe and Pl are given by the mathematical relations:

$$Pe = \sum_{n=0}^{N} po(n) * te(n) \text{ and } Pl = \sum_{n=0}^{N} po(n) * te(n)$$

Where te(n) and tl(n) correspond with the synch burst's template {t(n)} where t(n)=±1 for n=1 to N is the template sequence 78 for the sync burst so that:

| | |
|---|---|
| te(n) = t(n + 1) | n = 0 to N − 1 |
| = 0 | n = 0 |
| and | |
| tl(n) = t(n) | n = 1 to N |
| = 0 | n = 0 |

That is, te(.) and tl(.) are the same sequence as t(.) with a zero postpended and prepended, respectively. This type of processing permits both double correlators 74 and 76 to be loaded in a single step.

In other words, the double correlator 74 performs an early correlation by using the first 64 of the 65 samples to determine Pe while the second correlator in the double correlator 74 takes the last 64 of the 65 samples to determine Pl. Hence, use of the term "double" since the same correlation is performed on each set of samples to determine if they fit within an early or late hypothesis. For example, the correlation of Pe essentially consists of the summation of the first 64 of the 65 samples {p} which are weighted by the sequence template function 78. For Pl, the same correlation is performed on the last 64 of the 65 samples. Likewise, the processing steps to form Qe and Ql are exactly parallel to those set out above and are performed on the imaginary portion of the samples {q}.

Once the correlation values Pe, Pl, Qe, Ql are determined in the double correlators 74 and 76, these correlation outputs are combined in a modulus module 78 to determine the early modulus Re and the late modulus Rl. The mathematical function implemented is:

$$Re = \sqrt{Pe^2 + Qe^2} \text{ and } Rl = \sqrt{Pl^2 + Ql^2}$$

and is implemented as a table lookup. The modulus values Re and Rl provide an early and a late response that is independent of the channel phase. In this regard, by taking the magnitude of these variables, this eliminates any effect of phase on these variables (Pe, Qe, Pl, Ql). Thus, the modulus module 78 performs a modulus of the complex variables to provide a phase insensitive indicator of magnitude.

Since the synchronization burst processor 56 does not know beforehand whether the sync burst 52 is actually present in the sync burst slot 50 and/or whether the sync burst's alignment is sufficiently precise for the synchronization burst processor 56 to provide a good decision regarding the burst alignment, the values Re and Rl are tested in a test functions module 80 to provide an indication of whether a well aligned sync burst 52 is present and, if so, whether it is early or late relative to the corresponding sync burst slot 50. Three tests are performed as follows:

Test 1. An energy test based on the sum of Re and Rl. This sum is compared to a threshold and if the threshold is not exceeded, an "absent" outcome is declared. Alternate energy tests such as requiring that both Re and Rl each exceed a threshold may be used.

Test 2. If the energy test is passed, then a ratio test is performed to assess the magnitude of the timing error. One such test compares ABS[LOG[Re/Rl]] to a threshold and if the threshold is exceeded then an "absent" outcome is declared. A typical threshold for this test is LOG[5] for which the test will pass (under noiseless conditions and for rectangular QPSK) when the time alignment is within 33% of a symbol epoch.

Test 3. If the two criteria above are satisfied, the synchronization burst processor 56 concludes that a sync burst 52 is present in the slot 50 and forms an early/late decision by simply comparing Re and Rl. If Re is greater than Rl, then the decision is for early else for late.

Figure 5:
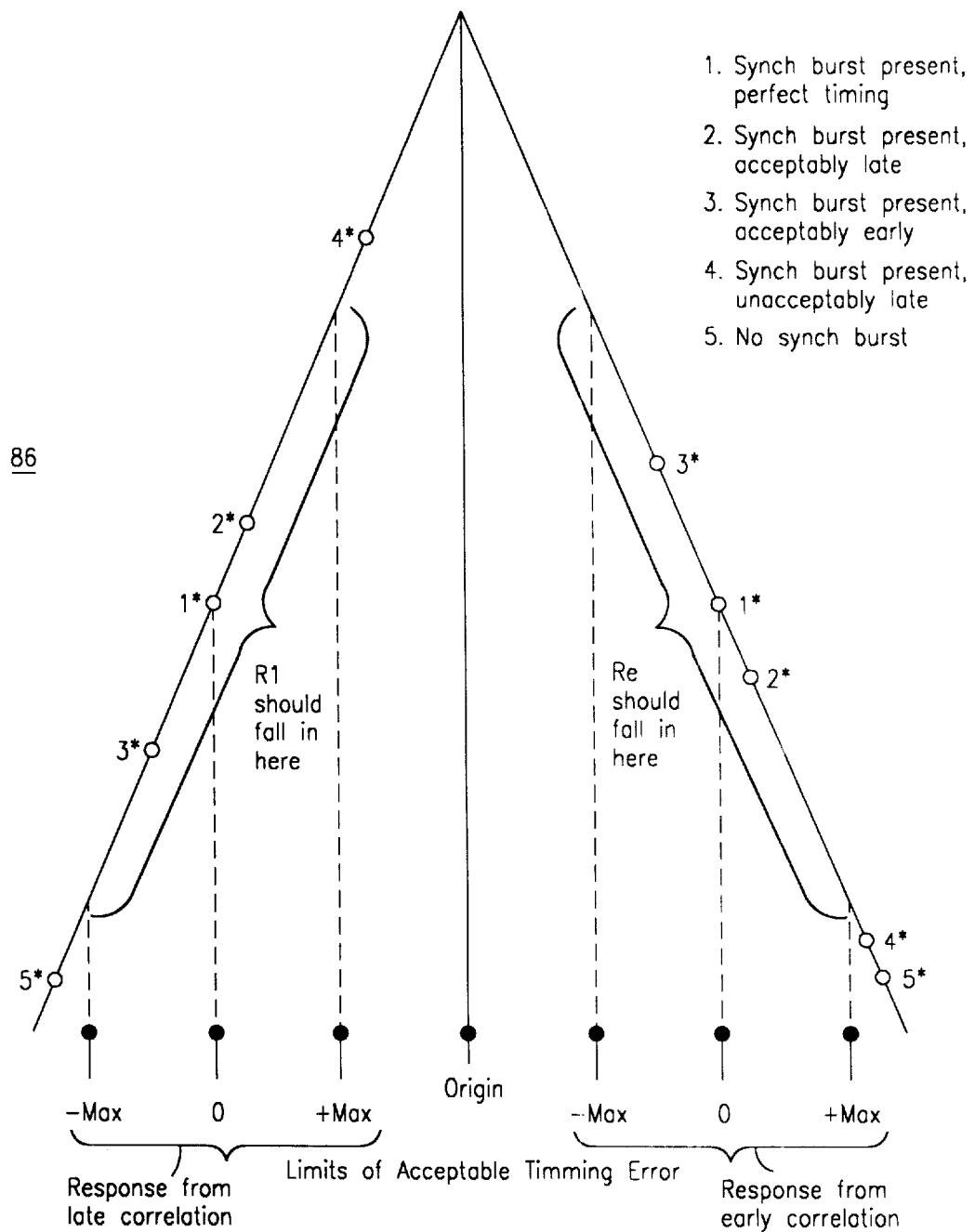
FIG. 5 is a graph of the response of the synchronization burst processor to sync bursts under varying degrees of time misalignment.
Figure 6:
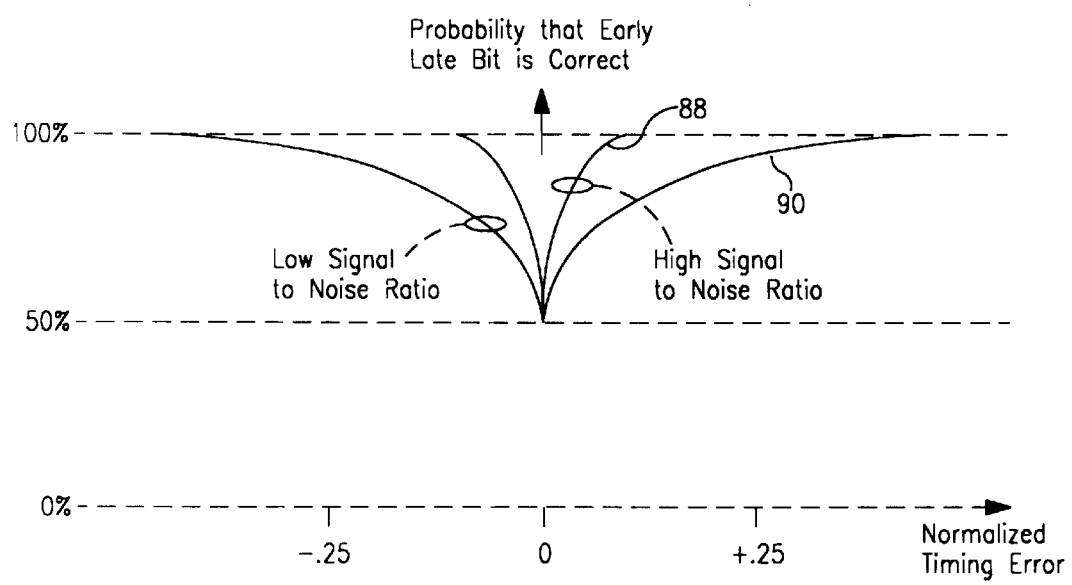
FIG. 6 illustrates a measure of probability response for the synchronization burst processor.

The early/late decisions from the synchronization burst processor 56 are not reliable when the timing error is zero since the symmetry of Rl and Re under these conditions results in a decision based wholly on noise (see FIGS. 5 and 6). That is, the early/late decision is equivalent to a coin toss when the timing is perfectly aligned. As misalignment increases, however, the reliability of the early/late dichotomy improves and gains a strong statistical bias towards the correct outcome (see FIG. 6). This bias, together with the integration of many such outcomes by the user terminals 14 which use the early/late decision to correct their uplink timing, results in a robust uplink timing tracking capability, even under conditions of low signal to noise.

The test functions module 80 repeats the processing described above for each of the burst slots 50 in the sync burst block 46, typically 500. A three outcome report (early, late, absent) is formed in which two bits are allocated to a specific sync burst 52 (identified by frequency channel and by time of occurrence in the uplink frame 44). These two bits or dibits are forwarded to a data set organizer 82 which are packed, eight to a byte, to form a composite status report for the sync bursts 52 encountered during the processing of the sync burst block 46. For the typical case described, a total of 1000 bits or 125 bytes are produced. The identity of the sync bursts 52 is implicit by its location within this data structure. This composite report is transferred by the data set organizer 82 to the on board processor 84 of the processing satellite 12 where it is typically packaged in ATM cells addressed to all user terminals 14 in the sub-band and these cells are entered into the downlink 18 for the beam containing the sub-band. This apprises the various user terminals 14 whose sync burst slot 50 reservation falls within the frame for which the processing of their timing status was just completed (i.e., early or late). In other words, a user terminal 14 will know if its sync burst 52 occurred within the sync burst slot 50, and whether or not it was late relative to the sync burst slot 50.

Turning to FIG. 5, the response of the synchronization burst processor 56 to sync bursts 52 under varying degrees of time misalignment is shown where the response is based on a rectangular QPSK signal. It should be noted that if the even samples were used rather than the odd samples, the response would be at the very peak of the response 86. However, since the odd samples are used, the modulus Re and Rl are offset by one half a symbol epoch down from the peak. In other words, if the sync burst 52 is perfectly aligned (i.e., signal is exactly on time), case no. 1 would result where early and late modulus responses Re and Rl provide the same response which are essentially a balanced output. Response No. 2 shows when the sync burst 52 is late but within acceptable limits. Condition No. 3 shows when the sync burst 52 is early and within acceptable limits. Condition 4 shows when the sync burst 52 is present and unacceptably late and not within acceptable limits, while Response No. 5 indicates that no sync burst 52 is present.

FIG. 6 illustrates the measure of performance of the synchronization burst processor 56. In this regard, FIG. 6 shows that when perfect timing (no error) occurs, a report of either late or early may be made with equal probability (i.e., Case No. 1 in FIG. 5) regardless of the signal to noise ratio. For Case No. 2 as shown in FIG. 5, upon comparing the ratio of Re to Rl one can observe that this response is late and therefore, the probability of reporting the right response is higher for either the high signal to noise ratio or the low signal to noise ratio as observed from curves 88 and 90, respectively.

In summary, the synchronization burst processor 56 determines the presence or absence of sync bursts 52, as well as whether the sync bursts 52 are early or late relative to the corresponding sync burst slot 50. The synchronization burst processor 56 determines this by performing double correlations half a symbol early and half a symbol late, as well as by preparing compact report messages on the early/late/absence status for all sync slots 50. Moreover, one synchronization burst processor 56 is used per sub-band such that there are generally seven (7) synchronization burst processors 56 for a particular cell 34 which receives the samples from the channelizer 68, independent of the satellite's main demodulator, and runs in X, Y or Z mode using only one sample per symbol. The synchronization burst processor 56 generally performs these functions by receiving the samples from the channelizer and matched filter 68 and passing the samples to the sample memory 72 through the select module 70 where the even samples are dropped. Samples from sub-bands used in FDMA mode (Y and Z) are interleaved on entry and in such modes in the sample memory 72 the addresses are read so the memory advances by the interleaved amount to demultiplex. N+1 odd samples from the center of the sync burst slot 50 are read from the sample memory 72 into the double correlators 74 and 76 which determine early and late correlation values (Pe, Pl, Qe, Ql). The modulus is taken of these variables in the modulus module 78 to provide early and late modulus values which are independent of phase (Re, Rl). The modulus values Re and Rl are tested for energy and gross timing error in the test functions block 80. If Re and Rl are well aligned relative to the sync burst slot 50, then Re and Rl are compared to form early and late bits. Two bit reports per sync burst slot 50 are aggregated in the data set organizer 82 to form combined reports for all bursts in the current sync burst block 46. These data sets are passed on a bus to the onboard control processor 84.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A synchronization burst processor for use in a processing satellite in a satellite based communications system, said synchronization burst processor comprising:
   a sync burst memory operable to store at least one sync burst transmitted from at least one terrestrial terminal to the processing satellite, said sync burst formed from a quadrature pair sample set $\{p, q\}$;
   a first double correlator operable to perform an early correlation and a late correlation of said p samples relative to a sync burst slot to generate an early correlation Pe and a late correlation Pl;
   a second double correlator operable to perform an early correlation and a late correlation of said q samples relative to said sync burst slot to generate an early correlation Qe and a late correlation Ql; and
   a modulus module operable to determine an early modulus Re and a late modulus Rl from said early correlations Pe and Qe and from said late correlations Pl and Ql, wherein said early modulus Re and said late modulus Rl are used to determine if said sync burst is present in said sync burst slot and if said sync burst is early or late relative to said sync burst slot.

2. The synchronization burst processor as defined in claim 1 further comprising a test functions module operable to perform tests on said early modulus Re and said late modulus Rl to determine if said sync burst is present in said sync burst slot and if said sync burst is early or late relative to said sync burst slot.

3. The synchronization burst processor as defined in claim 2 wherein said test functions module performs an energy test on a sum of said early modulus Re and said late modulus Rl, said sum being compared to a threshold, whereby if said threshold is not exceeded, an absent outcome is declared.

4. The synchronization burst processor as defined in claim 3 wherein said test functions module further performs a ratio test if said energy test is passed, said ratio test compares ABS [LOG[Re/Rl]] to a second threshold, whereby if said second threshold is exceeded then an absent outcome is declared.

5. The synchronization burst processor as defined in claim 4 wherein said test function module performs a third test if said energy test is passed and said ratio test is passed, said third test determines if said sync burst is early or late by comparing said early modulus Re with said late modulus Rl, whereby if said early modulus Re is greater than said late modulus Rl, then said sync burst is early, otherwise said sync burst is late.

6. The synchronization burst processor as defined in claim 1 wherein said quadrature pair sample set (p, q) stored in said sync burst memory are odd samples of said sync burst.

7. The synchronization burst processor as defined in claim 1 wherein said first double correlator and said second double correlator perform said early correlations and said late correlations against a sync burst template sequence which is loaded from an onboard processor on the processing satellite.

8. The synchronization burst processor as defined in claim 1 wherein said early modulus Re is determined by $Re=\sqrt{Pe^2+Qe^2}$ and said late modulus Rl is determined by $Rl=\sqrt{Pl^2+Ql^2}$.

9. The synchronization burst processor as defined in claim 1 further comprising a select module operable to select a quadrature pair sample set $\{p, q\}$ during a synchronization burst block, said quadrature pair sample set $\{p, q\}$ including odd and even quadrature pair samples from a plurality of sync bursts.

10. A synchronization burst processor for use in a processing satellite in a satellite based communications system, said synchronization burst processor comprising:
    a select module operable to select a quadrature pair sample set $\{p, q\}$ during a synchronization burst block, said quadrature pair sample set $\{p, q\}$ including odd and even samples from a plurality of sync bursts;
    a sync burst memory operable to store said odd samples from said quadrature pair sample set $\{p, q\}$ of said plurality of sync bursts;
    a first double correlator operable to perform an early correlation and a late correlation of said p samples from said sync burst memory against a sequence template to generate an early correlation Pe and a late correlation Pl;
    a second double correlator operable to perform an early correlation and a late correlation of said q samples from said sync burst memory against said sequence template to generate an early correlation Qe and a late correlation Ql; and
    wherein said early correlations Pe and Qe and said late correlations Pl and Ql are used to determine if each of said sync bursts are present in a corresponding sync burst slot and if each of said sync bursts are early or late relative to said corresponding sync burst slot.

11. The synchronization burst processor as defined in claim 10 further comprising a modulus module operable to determine an early modulus Re and a late modulus Rl from said early correlations Pe and Qe and from said late correlations Pl and Ql, whereby said early modulus Re and said late modulus Rl are used to determine if each of said sync bursts is present in said corresponding sync burst slot and if each of said sync bursts is early or late relative to said corresponding sync burst slot.

12. The synchronization burst processor as defined in claim 11 wherein said early modulus Re is determined by $Re=\sqrt{Pe^2+Qe^2}$ and said late modulus Rl is determined by $Rl=\sqrt{Pl^2+Ql^2}$.

13. The synchronization burst processor as defined in claim 10 further comprising a test functions module operable to determine if each of said sync bursts are present in said corresponding sync burst slot and if each of said sync bursts are early or late relative to said corresponding sync burst slot.

14. The synchronization burst processor as defined in claim 10 wherein said sequence template is loadable from an onboard control processor in the processing satellite.

15. A synchronization burst processor for use in a processing satellite in a satellite based communications system, said synchronization burst processor comprising:
    a first double correlator operable to perform an early correlation and a late correlation of p samples from a quadrature pair sample set $\{p, q\}$ of a sync burst to generate an early correlation Pe and a late correlation Pl;
    a second double correlator operable to perform an early correlation and a late correlation of q samples from said quadrature pair sample set $\{p, q\}$ of said sync burst to generate an early correlation Qe and a late correlation Ql;
    a modulus module operable to determine an early modulus Re and a late modulus Rl from said early correlations Pe and Qe and from said late correlations Pl and Ql; and
    a test functions module operable to determine if said sync burst is present in a sync burst slot and if said sync burst is early or late relative to said sync burst slot using said early modulus Re and said late modulus Rl.

16. The synchronization burst processor as defined in claim 15 wherein said test functions module performs an energy test on a sum of said early modulus Re and said late modulus Rl, said sum being compared to a threshold, whereby if said threshold is not exceeded, an absent outcome is declared.

17. The synchronization burst processor as defined in claim 16 wherein said test functions module further performs a ratio test if s aid energy test is passed, said ratio test compares ABS [LOG[Re/Rl]] to a second threshold, whereby if said second threshold is exceeded then an absent outcome is declared.

18. The synchronization burst processor as defined in claim 17 wherein said test function module performs a third test if said energy test is passed and said ratio test is passed, said third test determines if said sync burst is early or late by comparing said early modulus Re with said late modulus Rl, whereby if said early modulus Re is greater than said late modulus Rl, then said sync burst is early, otherwise said sync burst is late.

19. The synchronization burst processor as defined in claim 15 wherein said quadrature pair sample set {p, q} are odd samples of said sync burst.

20. The synchronization burst processor as defined in claim 15 wherein said first double correlator and said second double correlator perform said early correlations and said late correlations against a sync burst template sequence which is loaded from an onboard processor on the processing satellite.

* * * * *